United States Patent [19]

Kobayashi

[11] Patent Number: 5,007,017

[45] Date of Patent: Apr. 9, 1991

[54] METHOD AND APPARATUS FOR DATA COMMUNICATION THROUGH COMPOSITE NETWORK

[75] Inventor: Hideaki Kobayashi, Kanagawa, Japan

[73] Assignee: Hitachi, Ltd., Tokyo, Japan

[21] Appl. No.: 35,030

[22] Filed: Apr. 6, 1987

[30] Foreign Application Priority Data

Apr. 4, 1986 [JP] Japan .................. 61-77841

[51] Int. Cl.$^5$ ............................................. G06F 13/00
[52] U.S. Cl. .................................. 364/900; 364/940; 364/940.1; 364/940.71; 340/825.07; 340/825.52
[58] Field of Search .................. 364/200, 900; 340/825.06, 825.07, 825.03, 826, 827, 825.5, 825.05, 825, 825.01, 825.02, 825.52; 370/85

[56] References Cited

U.S. PATENT DOCUMENTS

| | | | |
|---|---|---|---|
| Re. 30,037 | 6/1979 | Bass | 364/900 |
| 4,016,369 | 4/1977 | Pedersen | 364/900 X |
| 4,034,351 | 7/1977 | Takezoe | 364/900 |
| 4,039,757 | 8/1977 | Frisone | 179/15 AL |
| 4,058,672 | 11/1977 | Crager et al. | 358/257 X |
| 4,058,672 | 11/1977 | Crager et al. | 358/257 X |
| 4,195,351 | 3/1980 | Barner et al. | 364/900 |
| 4,374,436 | 2/1983 | Armstrong | 364/900 X |
| 4,379,946 | 4/1983 | Mizuno et al. | 340/825.07 X |
| 4,413,258 | 11/1983 | Quick, Jr. et al. | 340/825.5 |
| 4,471,466 | 9/1984 | Stollberger | 364/900 |
| 4,477,882 | 10/1984 | Schumacker et al. | 364/900 |
| 4,510,492 | 4/1985 | Mori et al. | 340/825.05 |
| 4,596,013 | 6/1986 | Tashiro et al. | 340/825.05 X |
| 4,627,052 | 12/1986 | Hoare et al. | 370/88 |
| 4,680,581 | 7/1987 | Kozlik et al. | 340/825.06 |
| 4,706,080 | 11/1987 | Sincoskie | 340/825.03 X |
| 4,706,081 | 11/1987 | Hart et al. | 340/825.03 |

OTHER PUBLICATIONS

"Overview, How IBM addresses LAN requirements with the token ring," Data Communications, pp. 120-124, Feb. 1986.

Primary Examiner—Gareth D. Shaw
Assistant Examiner—Paul Kulik
Attorney, Agent, or Firm—Antonelli, Terry, Stout & Kraus

[57] ABSTRACT

Data communication through a composite network constituted by a plurality of mutually connected individual networks. When a center connected to a first network such as a wide-area telephone network and DDX for collecting information such as maintenance/-management information performs data communication with a plurality of work stations connected to a network such as LAN, the information collecting center transmits a composite command containing collectively assembled addresses of the object work stations and operation commands to these stations. The composite command is disassembled in the second network. According to one method, the command is executed by the relevant work station upon reception of the composite command which is subsequently transferred to the succeeding station.

10 Claims, 7 Drawing Sheets

FIG. 3
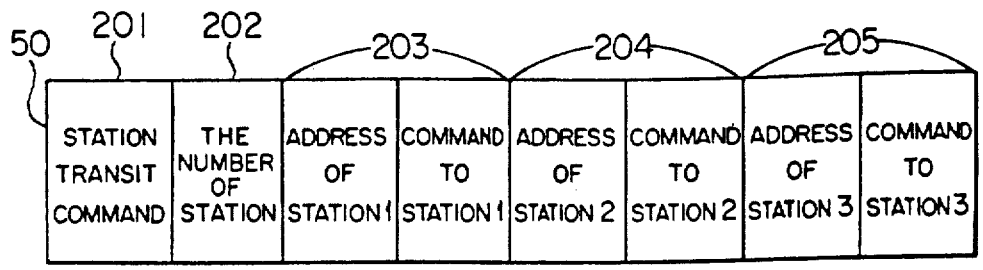
FIG. 4 PRIOR ART
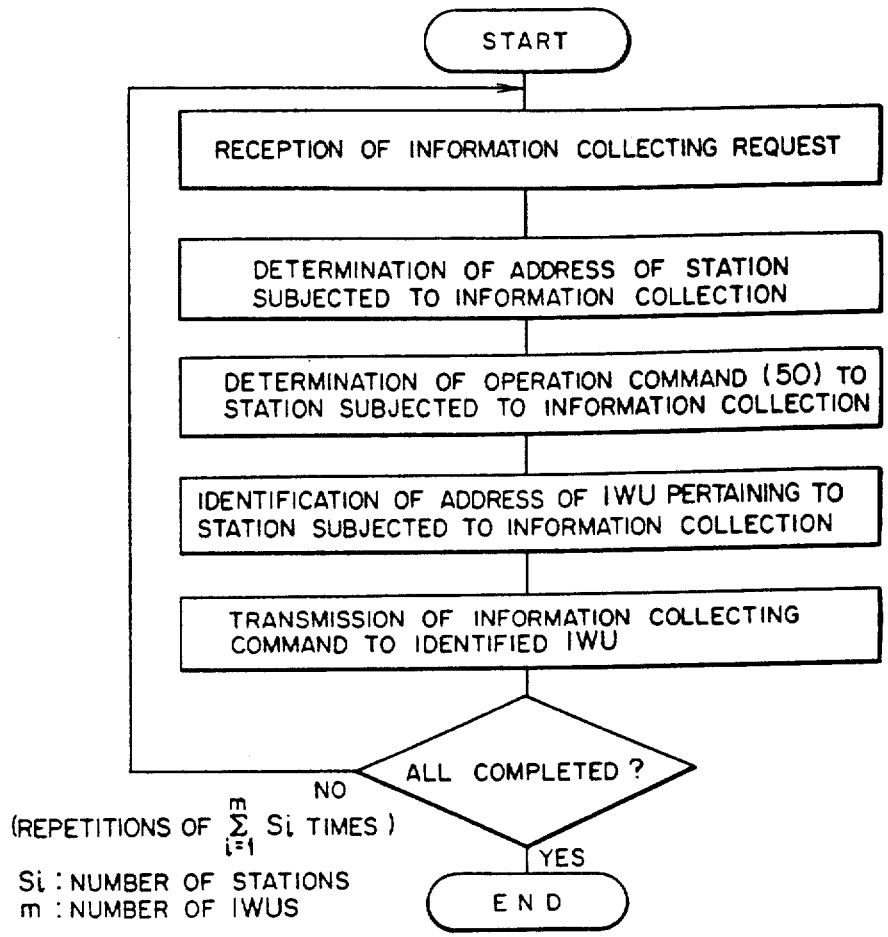
DATA TRANSMITTED TO IWU
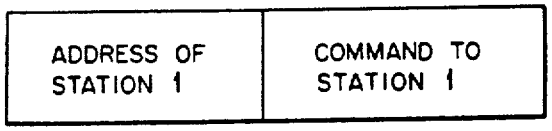

FIG. 8

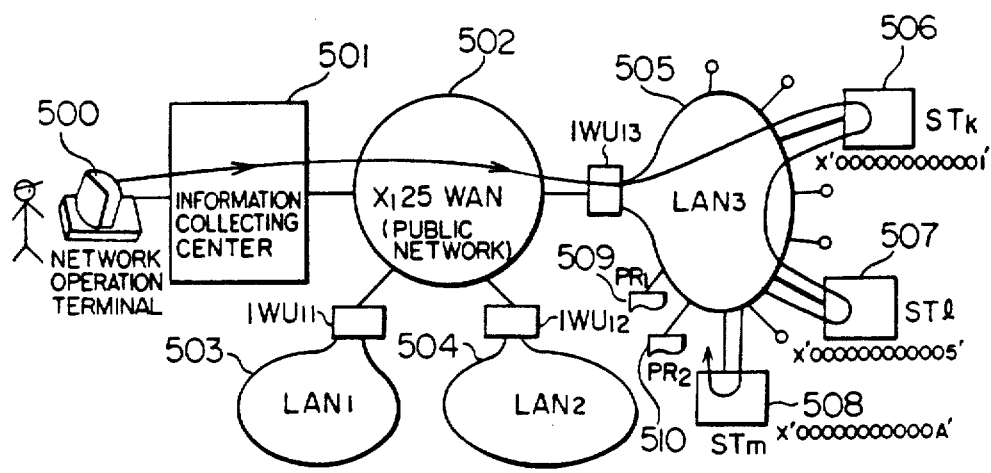

FIG. 9

| 1 | 1 | 1 | 1 | 6 | 1 |
|---|---|---|---|---|---|
| PLURAL STATION TRANSIT COMMAND ① | LENGTH OF PLURAL STATION TRANSIT COMMAND ② | THE NUMBER OF STATIONS ③ | LENGTH OF COMMAND TO STATION STk ④ | ADDRESS OF STATION STk ⑤ | COMMAND TO STATION STk ⑥ |
| X'01' | X'13' | X'03' | X'07' | X'000000000001' | X'11' |

| 1 | 6 | 1 | 2 |
|---|---|---|---|
| LENGTH OF COMMAND TO STATION STℓ ④ | ADDRESS OF STATION STℓ ⑤ | COMMAND TO STATION STℓ ⑥ | COMMAND PARAMETER TO STATION STℓ ⑥ |
| X'09' | X'000000000005' | X'13' | X'0102' |

| 1 | 6 | 1 |
|---|---|---|
| LENGTH OF COMMAND TO STATION STm ④ | ADDRESS OF STATION STm ⑤ | COMMAND TO STATION STm ⑥ |
| X'07' | X'00000000000A' | X'11' |

FIG. 10

TRANSIT COMMAND FROM STATION STk

| PLURAL STATION TRANSIT COMMAND (1) | LENGTH OF PLURAL STATION TRANSIT COMMAND (1) | THE NUMBER OF STATIONS (1) | LENGTH OF COMMAND TO STATION STl (1) | ADDRESS OF STATION STl (6) |
|---|---|---|---|---|
| X'01' | X'13' | X'02' | X'09' | X'000000000005' |

| COMMAND TO STATION STl (1) | COMMAND PARAMETER TO STATION STl (2) | LENGTH OF COMMAND TO STATION STm (1) | ADDRESS OF STATION STm (6) | COMMAND TO STATION STm (1) |
|---|---|---|---|---|
| X'13' | X'0102' | X'07' | X'00000000000A' | X'11' |

FIG. 11

TRANSIT COMMAND FROM STATION STl

| PLURAL STATION TRANSIT COMMAND (1) | LENGTH OF PLURAL STATION TRANSIT COMMAND (1) | THE NUMBER OF STATIONS (1) |
|---|---|---|
| X'01' | X'09' | X'01' |

| LENGTH OF COMMAND TO STATION STm (1) | ADDRESS OF STATION STm (6) | COMMAND TO STATION STm (1) |
|---|---|---|
| X'07' | X'00000000000A' | X'11' |

METHOD AND APPARATUS FOR DATA COMMUNICATION THROUGH COMPOSITE NETWORK

BACKGROUND OF THE INVENTION

The present invention relates to a method and apparatus for data communication through a composite network. More particularly, the invention concerns a data communication method and apparatus suited advantageously for a system in which an information collecting center connected to a certain network collects information from a plurality of work stations connected to another network.

In recent years, communication networks of various types, such as a digital data exchange network (hereinafter referred to as DDX in abbreviation), a value-added network (hereinafter referred to as VAN), a local area network (hereinafter referred to as LAN) and the others have been developed for various practical applications. Further, there has been realized a composite network which is constituted by interconnecting these various types of networks. A typical one of the hitherto known data communication systems based on the composite network concept is illustrated in FIG. 2 of the accompanying drawings.

In FIG. 2, a reference numeral 10 denotes a first network constituted by an external fee-charging network such as, for example, a DDX network designed for packet transmission, 20 denotes a second network such as a LAN. Both networks 10 and 20 are interconnected through an inter-working unit or IWU 200. Assuming now a network system in which an information collecting center 100 including a host computer or the like is connected to the first network as a terminal and in which a plurality of work stations exemplified by 310, 320 and 330 are connected to the network 20, consideration is made as to a manner in which the information collecting center 100 collects information from the work stations 310, 320 and 330. On the assumption, by way of the external network 10 which charges a fee in accordance with the amount of data for transmission, the information collecting center 100 issues an information collection command 50 first to the work station 310 to receive response information 55 from the station 310 in response to that command 50, after which the information collecting center 100 issues an information collecting command 60 to the work station 320 and receives response information 65 from that station 320, and finally the information collecting center 100 issues an information collecting command 70 to the work station 330 to receive therefrom the response information 75. The information collecting center 100 is typically imparted with a function to manage or supervise a number of the work stations.

The prior art system described above encounters no material problems so far as the transmission and reception of information are performed between the information collecting center and other work stations within the same network. However, a promising tendency will be seen in the information exchange performed through a composite network constituted by a plurality of networks interconnected to one another. In this connection, the prior art system in which the information collecting center issues commands separately and individually to each of the work stations on the one-by-one basis by way of a plurality of networks will require that a number of commands corresponding to that of the work stations have to be transmitted through the plurality of work stations enroute to the object station, involving a non-negligible increasing in the charged fee as well as the traffic. By the way, the data communication method through a composite network is proposed in N. C. Strole's article entitled "How IBM addresses LAN requirements with the token ring" of "Data Communications", February 1986, p.p. 120–124.

SUMMARY OF THE INVENTION

It is an object of the present invention to provide a data communication method and apparatus which can be realized inexpensively and enjoy high efficiency, and in which the charge and the traffic can be prevented from being increased by decreasing the number of transmission times a command passes through intermediate networks upon information exchange through a composite network.

Another object of the present invention is to provide a data communication method and apparatus in which a predetermined transmission data unit (packet) in the intermediate networks can be effectively utilized while reducing overhead involved in the transfer of information in response to the command.

To achieve the objects mentioned above, there are provided according to the present invention, means for combining and converting the individual commands issued by an information collecting center to a group of work stations connected to a given object network through intermediate or interposed networks into a collective single command (hereinafter referred to as a composite station command), and means for analyzing the incoming composite station command transmitted through the intermediate networks by a manager of the object (goal) network or by each of the work stations to thereby detect the addresses and sequences (the time points at which the response is completed) of the individual commands for allowing them to be distributed correspondingly.

According to an aspect of the present invention, using ring network data transmission, the information collecting center is so arranged as to issue a single station transit command as the composite station command upon transmission and reception of information through a plurality of work stations and intermediate networks connected to a given station. This station transit command includes information as to the number of work stations involved in the transmission and reception of information, the addresses of these participating work stations and operation commands for the individual work stations. Upon reception of the station transit command by a certain given work station in the object or goal network, the operation command for that certain work station is extracted by that station to be subsequently executed, whereupon the number of the work stations included in that command is decremented by one (i.e. −1) and the station transit command is then transferred to a succeeding work station. In this manner, the station transit command is relayed sequentially through the individual work stations successively with the operation commands to the respective work stations being extracted. When the number of work stations contained in the command is finally decreased to zero, the relaying operation comes to an end. The results of execution of the operation commands at the individual work stations are transmitted to the information collecting center as the response information separately or collectively as a whole.

According to another aspect of the invention, when the composite station command is transmitted to an object or goal network, a manager of that network interprets the composite station command and distributes the operation commands to the relevant work stations, respectively, to thereby allow the operation commands to be executed by the respective work stations rather than relaying the station transit command.

BRIEF DESCRIPTION OF THE DRAWINGS

FIG. 3 is a view showing, by way of example, a format of a composite station command which can be made use of in carrying out the invention;

FIG. 4 is a view illustrating in a flow chart a processing performed by an information collecting center of a hitherto known system;

FIG. 8. is a view showing an arrangement of a data communication system employing a composite network to which the invention is applied; and FIGS. 9 to 11 are views showing, respectively, formats of the composite commands for illustrating the operation of the system according to the illustrative embodiment of the invention.

DESCRIPTION OF THE PREFERRED EMBODIMENTS

Now, the invention will be described in detail in conjunction with an exemplary embodiment thereof with reference to FIGS. 1 to 7.

Figure 1:
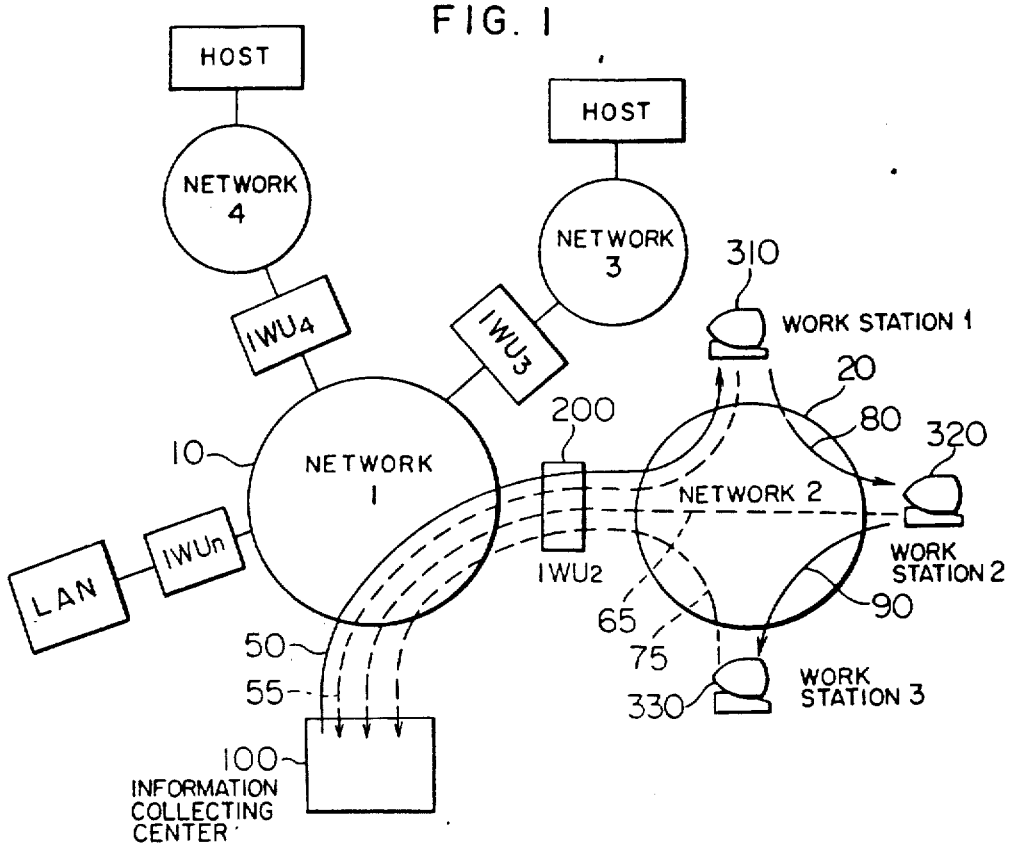
FIG. 1 is a view for illustrating the principle underlying a system according to the present invention.

FIG. 1 is a view showing flows of an information collecting command and response information in a system embodying the invention. For the purpose of illustration only, a manner in which the station transit command described hereinbefore is utilized is shown. Referring to FIG. 1, a first network (e.g. DDX) 20 which constitutes a fee-charging communication network such as DDX-P, ISDN, wide-area telephone network or the like and a second network (e.g. LAN, PBX or the like) 20 managed privately are connected to each other through an inter-working unit or IWU$_2$ 200. Connected to the network 10 is an information collecting center 100 serving as one terminal of the digital exchange network or DDX, while n work stations 310, 320, 330, ... are movably connected to the local area network or LAN 20. The information collecting center 100 may be constituted by a host computer, minicomputer or microcomputer or alternatively by one work station of the LAN. To the network 10, other networks 3, 4, ... n may be connected through IWU$_3$, IWU$_4$, ... IWU$_n$, respectively.

When the information collecting center 100 connected to the network 10 which performs the network management for the LAN 20 collects information such as that of fault management concerning the networking reliability, accounting, performance, configuration, security, directory, service and/or the like from the work stations 310, 320, 330, ... of the network 20, the information collecting center 100 imparted with a function for putting together in a composite form the management commands to the n work stations to be managed issues a command 50 for collecting the information for the work station management of the work station 310 and transmits to the object LAN 20 only once. FIG. 3 shows a format of the information collecting command 50. As will be seen in FIG. 3, the information collecting command includes a field 201 indicating that the command in concern is a station transit command which is successively circulated through the individual work stations connected in a ring-network form, a field 202 indicating the number of the work stations subjected to the collection of information, and station fields 203, 204 and 205 in a number which corresponds to that of the work stations, wherein each of the station fields contains an address of the associated work station and an operation command to that station. Each of the operation commands causes a program to be executed for fetching the various information mentioned above from the associated work station.

Figure 5:
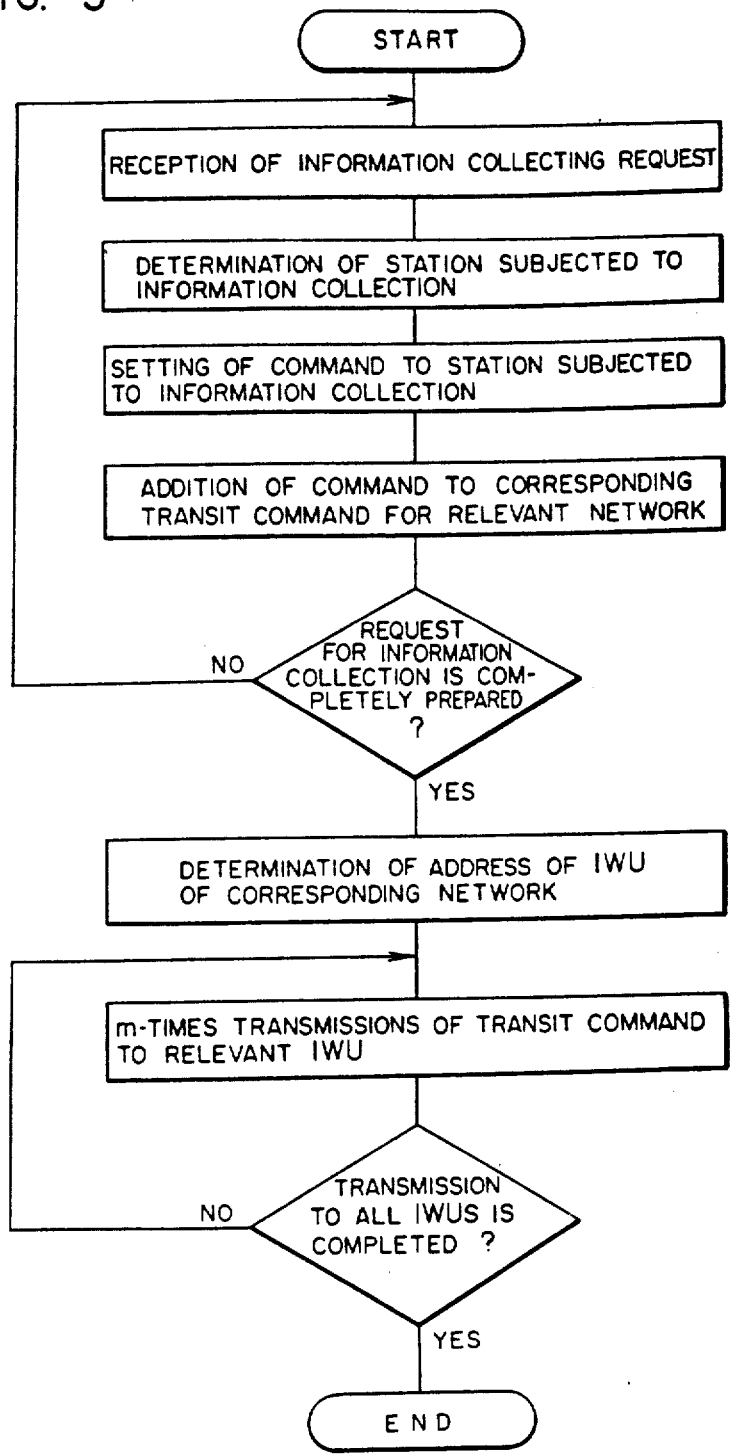
FIG. 5 is a view illustrating in a flow chart a processing performed by an information collecting center of a system according to an exemplary embodiment of the present invention.

A procedure executed by the information collecting center 100 for processing the command transmission is illustrated in FIG. 5 in the form of a flow chart on the assumption that the number of the stations connected to a network i is represented by Si and the number of the inter-working units or IWU of a network to which object or goal stations are connected is by m, comparatively with that of the prior art shown in FIG. 4 also in a flow chart. In the case of the prior art system, the data for transmission which includes a station address and an operation command for each station has to be transmitted to the IWU a number of times equal to that of the number of object stations, i.e. the number of times given by $$\sum_{i=1}^{m} Si.$$

Figure 2:
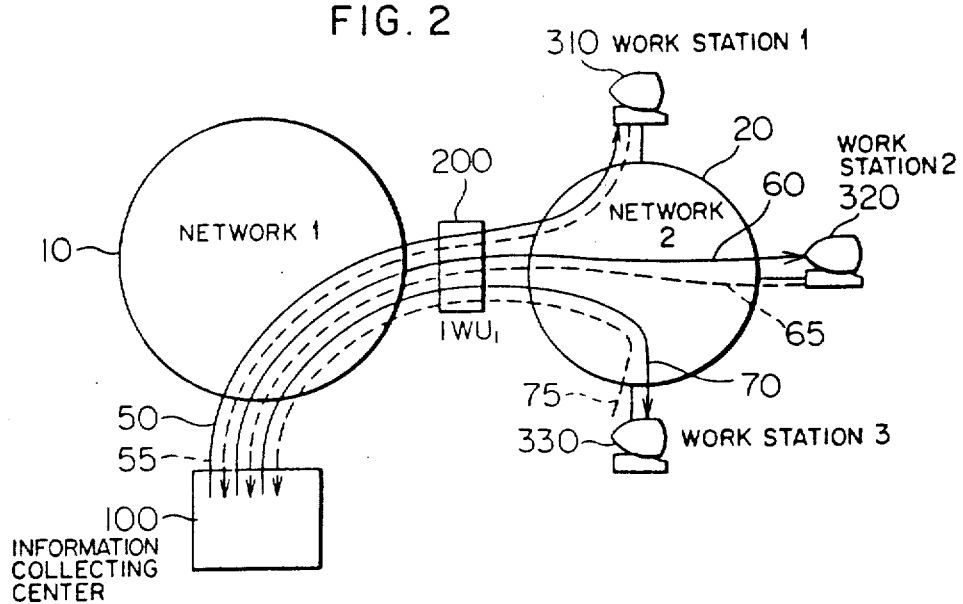
FIG. 2 is a schematic diagram for illustrating the hitherto known technique.

In contrast, in the case of the illustrative embodiment of the present invention, the data of the format shown in FIG. 2 is required to be sent out only the number of times equal to the number m of the IWUs.

When the information collecting command 50 received by the work station 310 of the network 20 contains the address in one of the station fields 203, 204 and 205 which designates the work station 310 itself, the latter executes the operation command thereto and responds to the information collecting center 100 by sending the response information 55. When the work station 310 recognizes from the data of the field 201 that the command in concern is the station transit command, the value contained in the field 202 is decremented by one ($-1$) and the information collecting command 50 under consideration is sent to the succeeding station 320 simultaneously with the above-mentioned responding operation. The work station 320 fetches and executes the operation command addressed to that station 320 to thereby respond to the information collecting center by sending the responsive information 65, while the value contained in the field 202 is decremented by one and the information collecting command is then transmitted to the succeeding work station 330 as a command 90. The work station 330 executes a similar processing to thereby send the responsive information 75 to the information collecting center, while the value contained in the field 202 of the command under consideration is again decremented by one. In the case of the illustrative embodiment, the value contained in the field 202 is decreased down to zero at this time point. Consequently, relaying of the command in concern to a succeeding work station from the station 330 is no longer carried out. Thus, the operation involving the information collecting command 50 comes to an end. Although the number of the stations subjected to information collection is assumed to be three in the case of the illustrative embodiment, it will be readily understood that the number can be selected arbitrarily. It should further be mentioned that the work stations of the LAN may have names specific to the individual stations as represented by the identification numbers, respectively, and may include those work stations which are independent of physical locations.

Figure 6:
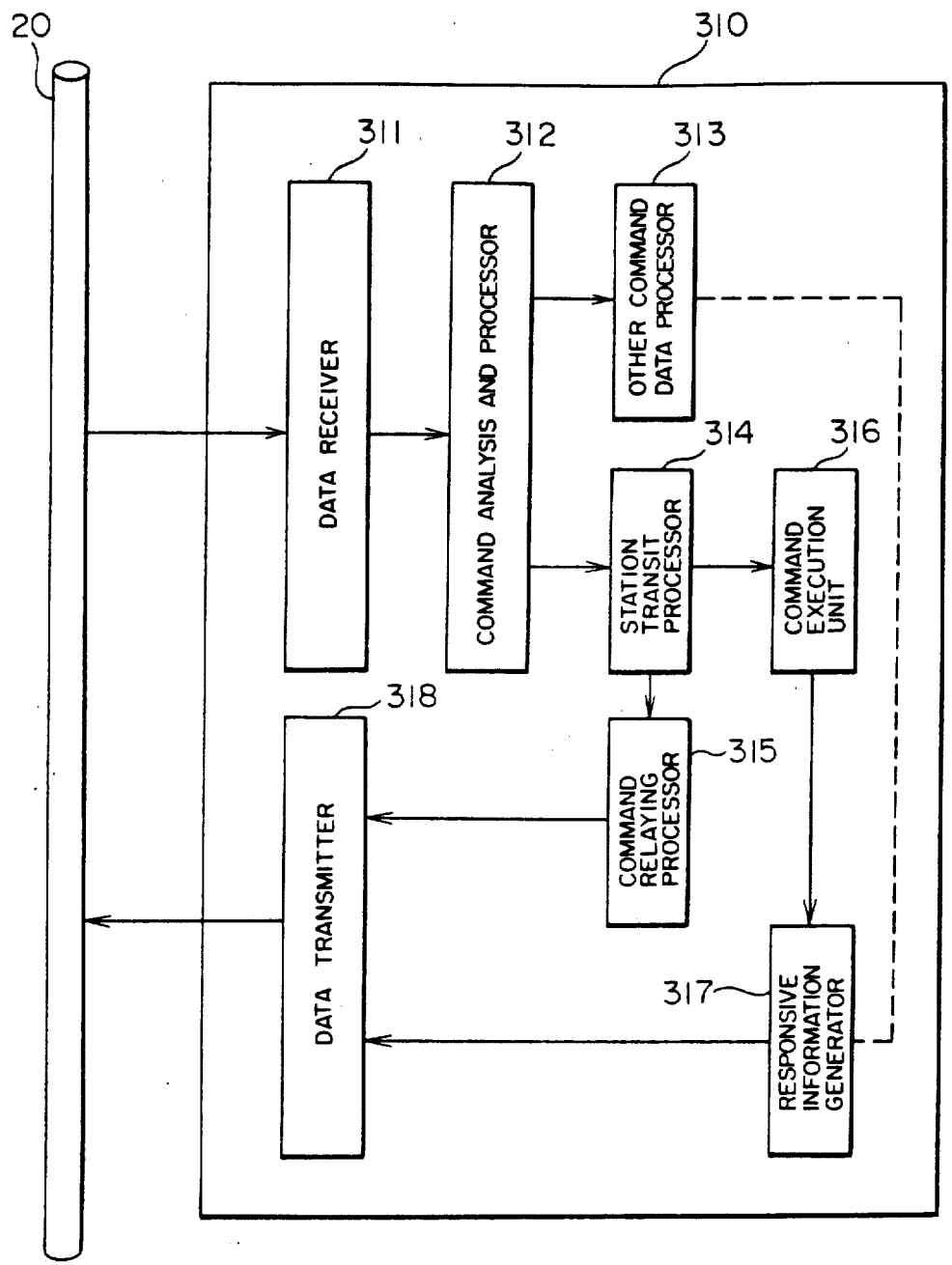
FIG. 6 is a functional block diagram showing an arrangement of a work station according to an embodiment of the invention.
Figure 7:
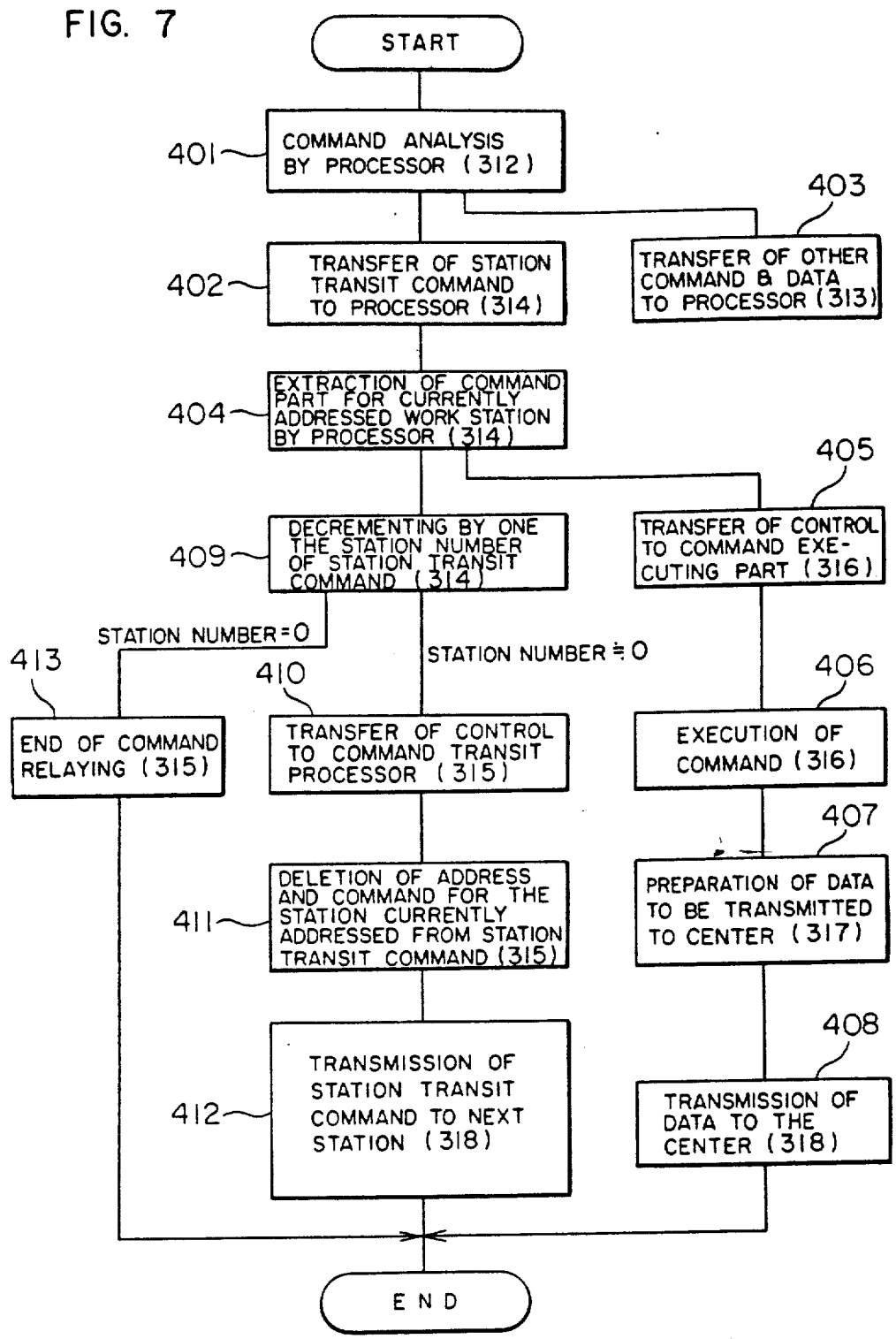
FIG. 7 is a view showing in a flow chart a processing performed by the work station shown in FIG. 6.

FIG. 6 is a block diagram showing a functional arrangement of the work station 310, and FIG. 7 shows a flow chart for illustrating the processing performed in the work station 310 upon reception of the information collecting command from the information collecting center. The same functional arrangement applies to the other work stations 320 and 330, respectively.

Referring to these figures, the work station 310 includes a data receiving part 311 which receives the information addressed to that station 310 from the network and transfers the received information to a command analyzing part 312. Decision as to whether or not the information is addressed to the work station 310 itself is made by comparing the station address contained in the information with the address previously allocated to that work station 310. The command analyzing part 312 analyzes the received information (step 401). When the information is of the station transit format, that command is transferred to a station transit command processing part 314 (step 402). On the other hand, in the case of the command or data other than the station transit command, the received command is transferred to a processing part 313 from the command analyzer 312 (step 403). In the following description, it is assumed that the analysis results in a determination that the command information is the information collecting command of the station transit command format.

The station transit command processor 314 extracts the operation command to the work station 310 itself (step 404), whereupon the operation command is transferred to a command executing part (step 405). The processing part 313 may be so implemented as to serve also as the executing part 316. Additionally, a station transit commanding part 314 decrements by one the value contained in the station number field of the command (step 409). When the subtraction results in zero, the transit or relaying of the command is ended (step 413). Otherwise, the station transit command is transferred to a command transit processing part 315 after the command to the station 310 has been processed (step 410).

The command executing part 316 composed of a microprocessor or the like executes the operation command (collection of information) to the currently addressed work station 310, the result of the execution being transferred to a transmission data generating part 317 (step 406). The transmission data generating part 317 edits the result of the execution in a format for data transmission to the information collecting center (step 407), the data for transmission thus prepared being sent out to the network 20 from a data transmitting part 318 (step 408).

On the other hand, the command transit processing part 315 to which the processing control is transferred from the station transit command processing part 314 deletes the address and the operation command from the fields of the station transit command which are assigned to the work station 314 (step 411). Subsequently, the command transit processing part 315 selects the address of the succeeding work station from the addresses of the work station fields of the command to send the station transit command to the succeeding work station through the data transmitting part 318 (step 412).

Information collected from the individual work stations at the step 408 may be sent to the network 20 and subsequently transmitted to the center 100 individually and separately through the fee-charging network 10 under the control of the IWU, as is shown in FIG. 1 or alternatively the response data from the individual work stations may be once stored in a memory by a manager which manages the data processing within the network 20 and subsequently transmitted en bloc to the center 100 through the network 10 after having been edited in a packet transmission format, as occasion requires.

The data transmission in the network 20 is not restricted to the ring-network connection of the work stations as with the case of the illustrative embodiment described above but can equally be applied to a network of such a type in which terminal control equipment (TCE) is provided in the network 20 so as to be capable of performing data transfer in parallel with the individual work stations.

In the foregoing description of the illustrative embodiment, it has been assumed that only one fee-charging network 10 is provided for the purpose of facilitation of description. However, it should be understood that the concept or principle of the present invention can also be applied to a system in which data transmission is performed through a plurality of fee-charging networks. According to the teaching of the present invention, the information collection for the concentrated management of a number of work stations can be programmed at optimum by connecting selectively the fee-charging networks on the basis of the characteristics indicating the time and packet-versus-fee relations of the fee-charging networks.

Now, a system which is arranged so as to perform various supervisory tests for a number of work stations from a concentrated maintenance center through a public network and to which the data communication method according to the invention can be applied will be described by referring to FIG. 8 showing an arrangement of the system and FIGS. 9 to 11 showing formats.

In FIG. 8, the composite network communication system includes a network operation terminal 500, an information collecting center 501, a public network WAN 502, inter-working units IWU 11, IWU 12, IWU 13, and LAN$_1$ 503, LAN$_2$ 504 and LAN$_3$ 505, which are connected to the public network. Connected to the LAN$_3$ 505 are at least work stations ST$_k$ 506, ST$_l$ 507 and ST$_m$ 508 having respective addresses (X'000000000001', X'000000000005' and X'00000000000A') and printers PR$_1$ 509 and PR$_2$ 510.

Referring to FIG. 8, it is assumed that a network operator working for the information collecting center 501 desires to perform network check operations for the network $LAN_3$ (505), by way of example, through the network operation terminal 500 connected to the information collecting center 501. In this connection, it is further assumed that the network operator requests the work station $ST_k$ 506 of the $LAN_3$ 505 connected to the public network WAN 502 to report the states of the apparatus (availability or unavailability) connected to the station $ST_k$, while requesting the work station $ST_l$ 507 to exchange the output printer $PR_1$ with the output printer $PR_2$, and the work station $ST_m$ to indicate the state of the apparatus connected to the station $ST_m$ as in the case of the station $ST_k$, respectively.

According to the illustrative embodiment of the invention, the above-mentioned requests to the work stations $ST_k$, $ST_l$ and $ST_m$ of the $LAN_3$ are not separately or discretely transmitted, but are sent to the LAN en bloc through the public network. A format of the plural station transit command is illustrated in detail in FIG. 9, in which each field is defined and elucidated in the following Table.

TABLE

| | | |
|---|---|---|
| (1) | plural station transit command | D'01' |
| (2) | Length of plural station transit command | Lengths of following transit command parts |
| (3) | The number of stations | The number of stations contained currently in the plural station transit command |
| (4) | Length of station command | Total length of values of address parts, command parts and command parameter for individual stations |
| (5) | Station address | LAN address of 6 bytes |
| (6) | Station commands and parameter | 6-byte command for station |
| | First four bits X'1X' | Command for configuration management |
| | First four bits X'2X' | Command for fault management |
| | First four bits X'3X' | Command for accounting management |
| | First four bits X'4X' | Command for performance management |
| | First four bits X'5X' | Command for security management |
| | . | |
| | . | |
| | Last four bits . . . | Command for configuration management |
| | X'11' | Report of station state |
| | X'12' | Station stop command |
| | X'13' | Exchange of station output printers (In this case, the succeeding two bytes are utilized for setting the printer numbers before and after the exchange by one byte, respectively) |
| | . | |
| | . | |
| | Last four bits . . . | Command for fault management |
| | X'21' | Command for reading out a fault counter (In this case, the succeeding one byte is utilized for setting the fault counter) |
| | X'22' | Test command (In this case, the succeeding one byte is utilized for setting the test number) |

The plural station transit command transmitted to the $LAN_3$ is transferred to the individual stations within $LAN_3$. First, the station identifies that the command is the plural station transit command from the fact that the first one byte is X'01'. In the case of the plural station transit command, the number of stations is checked. Unless the number is zero, the length of the command part to the station to be processed at this time can be determined from the succeeding one byte. Accordingly, the command data of the length corresponding to the determined one is analyzed. First, it is checked whether the station address part (X'000000000001') is the same as that of the station being currently accessed. If not, the plural station transit command is relayed to the succeeding station. In this manner, the plural station transit command is relayed until it has reached the station allocated with the same address as one contained in the command. In the station where address coincidence is found, the command of the command data field and the command parameter are analyzed. In the case of the exemplary embodiment being now considered, the station $ST_k$ can find from the last four bits X'11' that the command in concern requests a report about the state of the apparatus connected to this station. Accordingly, the processing is performed in conformance with this request. The remaining parts of the command are transferred to the succeeding station. Further, the station $ST_k$ deletes the command data part directed to that station $ST_k$ and decrements the station number by one. As a result, the data format of the plural station transit command becomes as shown in FIG. 10. In the station $ST_l$, a similar analysis of the plural station transit command is performed to thereby exchange the output printer $P_2$ by the printer $P_1$. The data format of the plural station transit command is again rewritten to be subsequently transferred to the succeeding station. The rewritten command data format is shown in FIG. 11.

In the station $ST_m$, similar analysis of the plural station transit command is performed to execute the processing for indicating the apparatus state. Since the decrementing of the station number by one results in zero in this station $ST_m$, the plural station transit command disappears at this station. The results of the processings performed at the stations $ST_k$, $ST_l$ and $ST_m$ are transmitted to the information collecting center.

As will be appreciated from the foregoing description, it is possible according to the invention to execute commands for a plurality of work stations connected to an object network by transmitting a single command in a transit manner through interposed networks, whereby the number of the commands flowing through the interposed network can be reduced to one, which is turn results in a significant reduction in the charging fee as well as the overhead involved in the command transfer from the information center.

What is claimed is:

1. A method of data communication through a composite network system in which a plurality of networks are connected to one another, wherein a center having an information collecting function connected to a first network performs data communication with a plurality of work stations connected to a second network, comprising the steps of:

formating at said center a composite command in the form of a data unit in which plural pairs of information including addresses of the work stations from which information is collected and commands to said work stations associated with said addresses are contained collectively;

transmitting said formated composite command to said second network through said first network; and furnishing the composite command successively to work stations in said second network, and extracting respective commands to the work stations by individual work stations from the composite command on the basis of the addresses associated with the commands as contained in said composite command.

2. A method of data communication according to claim 1, wherein the furnishing step includes identifying and fetching a command from said composite command in a work station having the address associated with the command upon reception of said composite command, deleting the associated address and command fetched in said work station from said composite command on the basis of said identification, and successively transmitting said composite command thus processed by said deleting step through succeeding work stations.

3. A method of data communication according to claim 1, wherein said first network includes a publicly utilizable data communication network, said second network being connected to said first network through an inter-working unit, and said center including at least an inter-working unit for connecting said center to said first network.

4. A method of data communication according to claim 1, wherein response information from said work stations is transmitted individually or collectively to said first network in accordance with a request from said center.

5. A method of data communication according to claim 1, wherein said first network is a packet switching network, and said formating step includes assembling said composite command in a format according to a predetermined packet format for said second network.

6. A method of data communication according to claim 1, wherein said data unit comprises a data packet.

7. A composite network data communication system, in which a plurality of networks are connectable to one another, and wherein a managing center connected to a first network performs data communication with a plurality of work stations connected to a second network;

said center including formating means for forming a composite command including, collectively, information pairs comprising associated addresses and operation commands for respective work stations to be managed and means for sending out said composite command to said second network;

each work station in said second network including means for receiving and extracting an operation command for that work station from the received composite command on the basis of the address associated with the operation command, and means for transmitting a remaining portion of the received composite command to another work station.

8. A method of data communication through a composite network system in which a plurality of networks are connected to one another, wherein a center having an information collecting function connected to a first network performs data communication with a plurality of work stations connected to a second network, comprising the steps of:

formating at said center a composite command in the form of a data unit in which plural pairs of information including addresses of the work stations from which information is collected and commands to said work stations associated with said addresses are contained collectively;

transmitting said formated composite command to said second network through said first network; and furnishing the composite command successively to work stations in said second network, and extracting respective commands to the work stations by individual work stations from the composite command on the basis of the addresses associated with the commands as contained in said composite command;

wherein said furnishing step includes identifying and fetching a command from said composite command in a work station having the address associated with the command upon reception of said composite command, deleting the associated address and command fetched in said work station from said composite command on the basis of said identification, and successively transmitting said composite command thus processed by said deleting step through succeeding work stations; and wherein said composite command includes at least a field indicating a station transit command, a field indicating a number of stations subjected to collection of information, address fields for addresses of work stations subjected to collection of information, and operation command fields for work stations subjected to collection of information.

9. A method of data communication through a composite network system in which a plurality of networks are connected to one another, wherein a center having an information collecting function connected to a first network performs data communication with a plurality of work stations connected to a second network, comprising the steps of:

formating at said center a composite command in the form of a data unit in which plural pairs of information including addresses of the work stations form which information is collected and commands to said work stations associated with said addresses are contained collectively;

transmitting said formated composite command to said second network through said first network; and furnishing the composite command successively to work stations in said second network, and extracting respective commands to the work stations by individual work stations from the composite command on the basis of the addresses associated with the commands as contained in said composite command;

wherein said information collecting center includes a program for testing work stations for maintenance to perform a management for said work stations.

10. A method of data communication through a composite network system in which a plurality of networks are connected to one another, wherein a center having an information collecting function connected to a first network performs data communication with a plurality of work stations connected to a second network, comprising the steps of:

formating at said center a composite command in the form of a data unit in which plural pairs of information including addresses of the work stations from which information is collected and commands to said work stations associated with said addresses are contained collectively;

transmitting said formated composite command to said second network through said first network; and furnishing the composite command successively to work stations in said second network, and extracting respective commands to the work stations by individual work stations from the composite command on the basis of the addresses associated with the commands as contained in said composite command;

wherein said composite command includes at least a field indicating a station transit command, a field indicating a number of stations subjected to collection of information, address fields for addresses of work stations subjected to collection of information, and operation command fields for work stations subjected to collection of information.

* * * * *